Patented Aug. 12, 1941

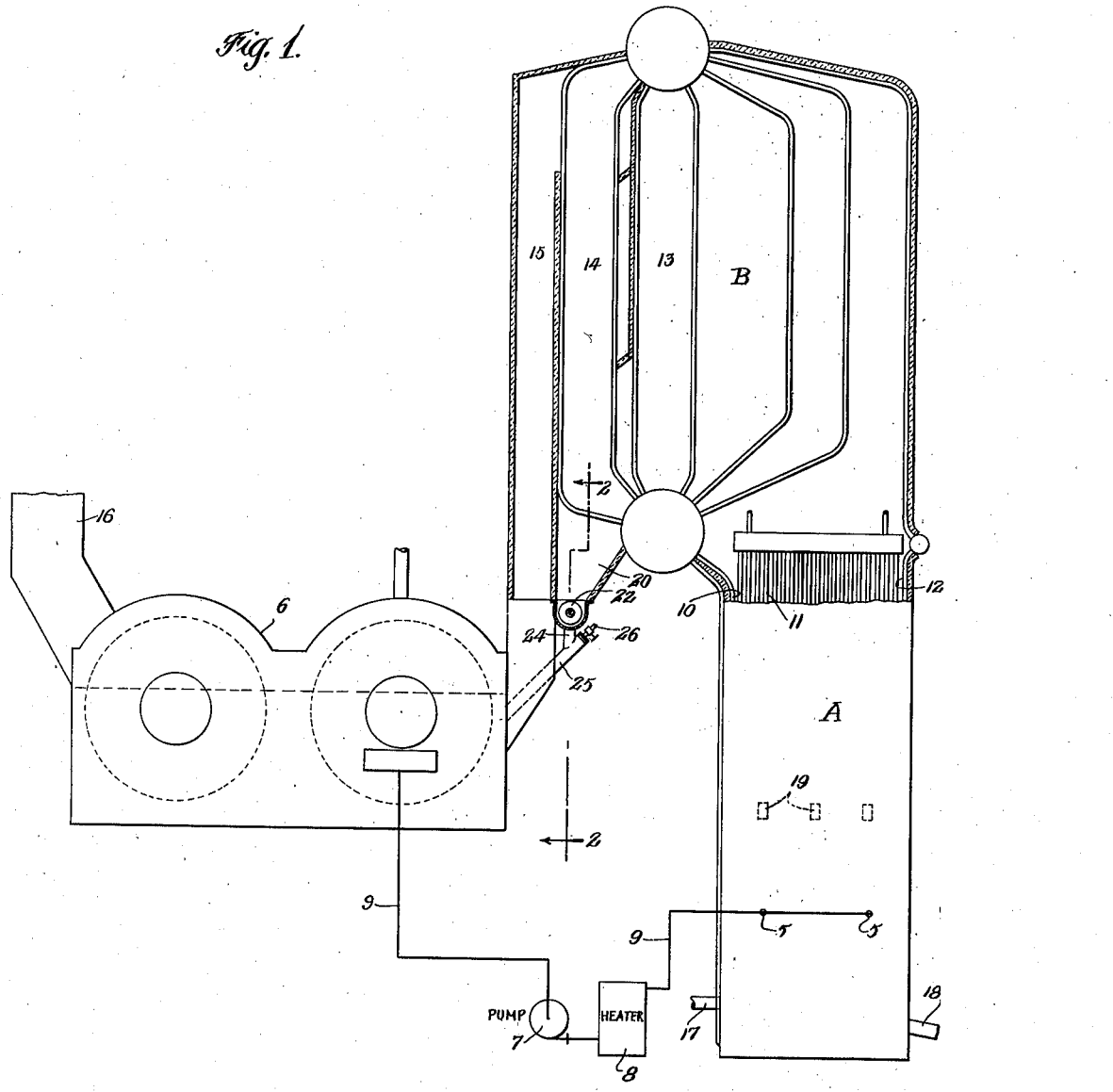

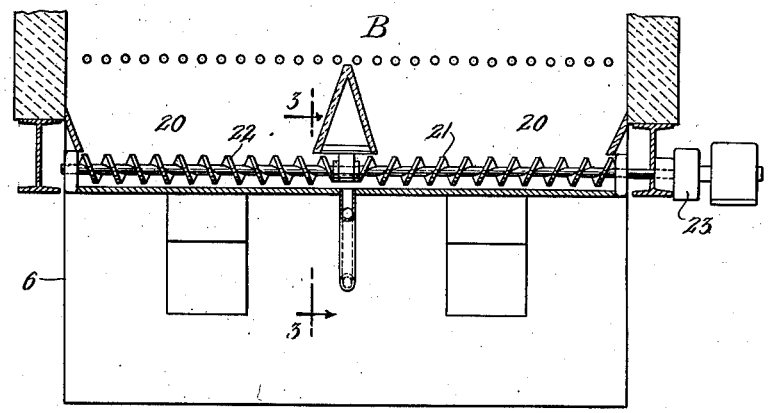
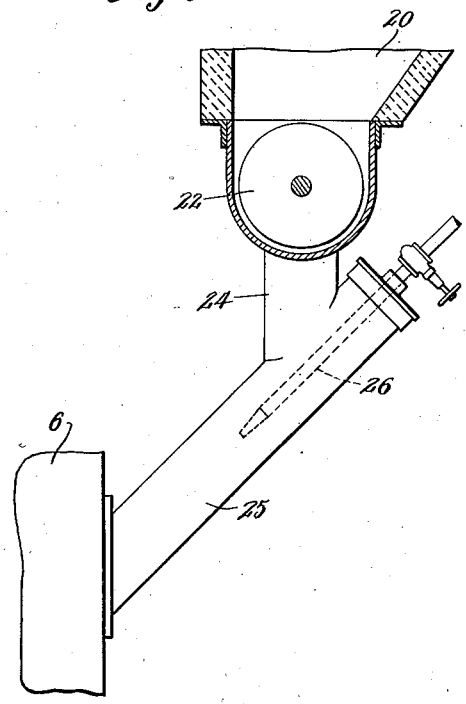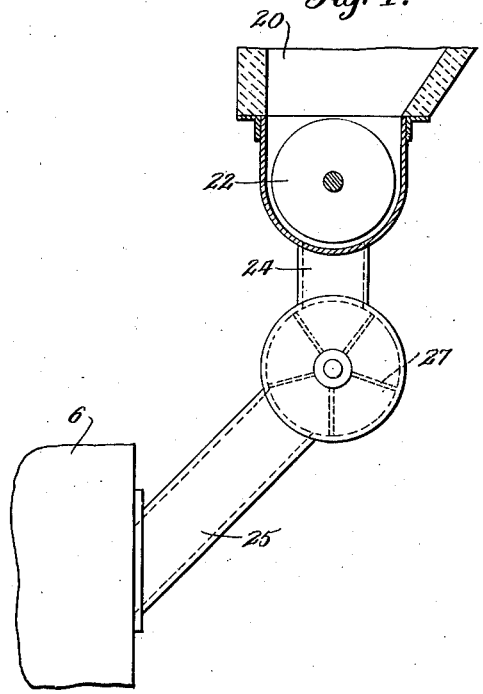

2,252,307

UNITED STATES PATENT OFFICE 2,252,307

DUST RECOVERY APPARATUS FOR CHEMICAL AND WASTE HEAT RECOVERY INSTALLATIONS

Fay Harry Rosencrants, Scarsdale, N. Y., assignor to Combustion Engineering Company, Inc., New York, N. Y., a corporation of Delaware Application June 15, 1939, Serial No. 279,278

5 Claims. (Cl. 23—262)

This invention relates to apparatus for the recovery of dust in chemical and waste heat recovery installations, such as those employed to recover heat and chemicals from black liquor obtained in the preparation of pulp from wood by the caustic soda or the sulphate process, and for returning the dust into the installation.

In such installations evaporators are employed for removing water from the black liquor, and I propose to return the dust thereto where it mixes with liquor and from which it is delivered to the furnace nozzles and thereby is automatically returned to the furnace.

One of the primary objects of my invention is to provide dust recovery apparatus of the above character which operates as a seal between the zone of higher pressure of the furnace and the zone of lower pressure of the evaporator.

Another object of my invention resides in the provision of apparatus of the above character employing positive means for moving the dust.

How the foregoing, together with such other objects and advantages as may hereinafter appear, or are incident to my invention are realized, is illustrated in preferred form in the accompanying drawings, wherein—

Figure 1 is a sectional, elevational view of a chemical recovery furnace, waste heat boiler and evaporator illustrating my invention applied thereto;

Figure 2 is a cross-section taken substantially on the line 2—2 of Figure 1;

Figure 3 is an enlarged section taken substantially on the line 3—3 of Figure 2; and Figure 4 is a section similar to that of Figure 3, but illustrating a modification of the invention.

In Figure 1 I have shown a furnace A having nozzles 5 for delivering preheated black liquor from the disc evaporator 6 into the furnace under pressure, a pump 7 and a heater 8 being located in the delivery line 9 running from the evaporator to the nozzles. Steam evaporating tubes 10, 11 and 12 of any well-known arrangement line the walls of the furnace A.

A boiler B is located above the furnace A and is baffled to provide a plurality of gas passes 13, 14 and 15, the gases finally passing downwardly in the pass 15 to the evaporator 6 and being discharged therefrom through a stack 16.

Water is evaporated from the introduced black liquor in space in the furnace, and the solid content or black ash falls to the hearth of the furnace in almost dry state where it accumulates in a bed to which preheated air is admitted as by means of a conduit 17. In this bed remaining moisture in the black ash is evaporated, distillation of the volatiles and burning of the solid combustible materials take place, and the sodium sulphate is converted into sodium sulphite which may be discharged through a spout 18.

Preheated air to complete combustion is introduced into the furnace as by means of air inlets indicated at 19.

Dust which is carried on through the boiler accumulates in a hopper 20 located at the bottom of the boiler pass 14 for automatic and constant return to the disc evaporator 6. In order to accomplish this, I have provided screw conveyor means at the bottom of the hopper for removing the dust from the hopper.

In this instance I have illustrated a furnace of such width that I preferably employ two such conveyor screws 21 and 22, both of which are rotated in the same direction by any suitable drive means such as the motor driven gear drive indicated at 23, but one of which has a right-hand screw and the other a left-hand screw arranged so that discharge of the dust is at the middle of the hopper. A downwardly extending discharge pipe 24 is located to receive the discharging dust from the conveyor screws. This discharge pipe 24 is connected to deliver into an inclined pipe 25 leading to the disc evaporator 6.

By referring to Figure 3, it will be seen that I have provided a jet device 26 in the pipe 25 which may be air or steam actuated and which produces a flow of the dust into the evaporator where it mixes with the liquor, and is thus automatically returned to the furnace nozzles 5, 5, as liquor is pumped from the evaporator to the nozzles.

In the modification illustrated in Figure 4 I have shown a star wheel 27 for moving the dust from the hopper to the evaporator in place of the ejector device shown in Figure 3.

It is to be observed that I have provided a dust recovery device which is particularly advantageous for installations of the character above described, because it acts as a positive feed for the dust and also serves as an effective seal as between the zone of higher pressure of the boiler and the zone of lower pressure of the disc evaporator.

I claim:

1. In dust recovery apparatus for chemical and waste heat recovery installations having a recovery furnace, a boiler and heat recovery unit providing a plurality of passes for the passage of combustion gases, an evaporator for increasing the density of black liquor to a value above the normal density thereof, and means for feeding high density black liquor from said evaporator into said furnace, the combination of a dust collecting hopper connected to one of the said passes, a pipe for delivering dust from said hopper to said evaporator, said pipe being connected into said evaporator at a point below the level of the liquor in said evaporator, conveyor means between said hopper and delivery pipe for delivering dust from the hopper into said delivery pipe, means for moving the dust through said delivery pipe to said evaporator, and a conduit connecting the final pass in the heat recovery unit to the evaporator.

2. In dust recovery apparatus for chemical and waste heat recovery installations having a recovery furnace, a boiler and heat recovery unit providing a plurality of passes for the passage of combustion gases, an evaporator for increasing the density of black liquor to a value above the normal density thereof, and means for feeding high density black liquor from said evaporator into said furnace, the combination of a dust collecting hopper connected to one of the said passes, a pipe for delivering dust from said hopper to said evaporator, said pipe being connected into said evaporator at a point below the level of the liquor in said evaporator, a screw conveyor for delivering dust from said hopper to said delivery pipe, means for moving the dust through said delivery pipe to said evaporator, and a conduit connecting the final pass in the heat recovery unit to the evaporator.

3. In dust recovery apparatus for chemical and waste heat recovery installations having a recovery furnace, a boiler and heat recovery unit providing a plurality of passes for the passage of combustion gases, an evaporator for increasing the density of black liquor to a value above the normal density thereof, and means for feeding high density black liquor from said evaporator into said furnace, the combination of a dust collecting hopper connected to one of the said passes, a pipe for delivering dust from said hopper to said evaporator, said pipe being connected into said evaporator at a point below the level of the liquor in said evaporator, conveyor means between said hopper and delivery pipe for delivering dust from the hopper into said delivery pipe, ejector means for producing a flow of dust through said delivery pipe to said evaporator, and a conduit connecting the final pass in the heat recovery unit to the evaporator.

4. In dust recovery apparatus for chemical and waste heat recovery installations having a recovery furnace, a boiler and heat recovery unit providing a plurality of passes for the passage of combustion gases, an evaporator for increasing the density of black liquor to a value above the normal density thereof, and means for feeding high density black liquor from said evaporator into said furnace, the combination of a dust collecting hopper connected to one of the said passes, a pipe for delivering dust from said hopper to said evaporator, said pipe being connected into said evaporator at a point below the level of the liquor in said evaporator, a screw conveyor for delivering dust from said hopper to said delivery pipe, jet means for producing a flow of dust through said delivery pipe to said evaporator, and a conduit connecting the final pass in the heat recovery unit to the evaporator.

5. In dust recovery apparatus for chemical and waste heat recovery installations having a recovery furnace, a boiler and heat recovery unit providing a plurality of passes for the passage of combustion gases, an evaporator for increasing the density of black liquor to a value above the normal density thereof, and means for feeding high density black liquor from said evaporator into said furnace, the combination of a dust collecting hopper connected to one of the said passes, a delivery conduit for the dust leading from said hopper to said evaporator, said delivery conduit being connected into said evaporator at a point below the level of the liquor in said evaporator, combined dust feeding and sealing means between said hopper and delivery conduit, and a conduit connecting the final pass in the heat recovery unit to the evaporator.

FAY HARRY ROSENCRANTS.